(12) United States Patent
Kobayashi (10) Patent No.: US 8,196,932 B2
(45) Date of Patent: Jun. 12, 2012

(54) SEALING DEVICE FOR UNIVERSAL JOINT (75) Inventor: Naoto Kobayashi, Fukushima (JP)

(73) Assignee: NOK Corporation (JP)

( * ) Notice: Subject to any disclaimer, the term of this patent is extended or adjusted under 35 U.S.C. 154(b) by 164 days.

(21) Appl. No.: 12/680,883

(22) PCT Filed: Sep. 29, 2008

(86) PCT No.: PCT/JP2008/067603
§ 371 (c)(1),
(2), (4) Date: Mar. 30, 2010

(87) PCT Pub. No.: WO2009/047991
PCT Pub. Date: Apr. 16, 2009

(65) Prior Publication Data
US 2010/0289226 A1     Nov. 18, 2010

(30) Foreign Application Priority Data

Oct. 12, 2007     (JP) ................. 2007-266314

(51) Int. Cl.
*F16J 9/00*     (2006.01)
*F16J 15/32*     (2006.01)
(52) U.S. Cl. ........................... 277/345; 277/551
(58) Field of Classification Search ............... 277/585, 277/586, 345, 347, 353, 551, 412
See application file for complete search history.

(56) References Cited

U.S. PATENT DOCUMENTS

| | | | | |
|---|---|---|---|---|
| 2,773,366 A | * | 12/1956 | Slaght | 464/131 |
| 2,896,432 A | * | 7/1959 | Hempel | 464/131 |
| 3,138,942 A | * | 6/1964 | Kayser | 464/131 |
| 3,858,413 A | * | 1/1975 | Nemtsov et al. | 464/14 |
| 4,134,596 A | * | 1/1979 | Kawai et al. | 277/568 |
| 4,311,315 A | * | 1/1982 | Kronenberg | 277/397 |
| 4,337,628 A | * | 7/1982 | Greene | 464/131 |

(Continued)

FOREIGN PATENT DOCUMENTS

EP     1312685     5/2003

(Continued)

OTHER PUBLICATIONS

Extended European Search Report, dated Dec. 14, 2010, Application No. EP 08835597.9.

(Continued)

*Primary Examiner* — Vishal Patel
(74) *Attorney, Agent, or Firm* — Harness, Dickey & Pierce, P.L.C.

(57) ABSTRACT

To prevent damage and malfunction, a sealing device for a universal joint has a metal ring (11) fitted on the outer peripheral surface of a shaft portion (111) of a cruciform spider (110) of the universal joint, and inner seal lips (12, 13) and an outer seal lip (14) made of a rubber-like elastic material and provided integrally with the metal ring (11), the inner seal lips (12, 13) slidably contact with the inner peripheral surface of an end of an outer ring (121) of a bearing (120) relatively rotatably supporting the shaft portion (111), the outer seal lip (14) slidably contact with a rising surface (112*a*) of a boss portion (112) of the cruciform spider (110), and the rising surface (112*a*) is a surface rising, outside the position where the metal ring (11) is fitted, in an outward radial direction from the shaft portion (111).

3 Claims, 9 Drawing Sheets

U.S. PATENT DOCUMENTS

| | | | |
|---|---|---|---|
| 4,377,312 A * | 3/1983 | Zackrisson | 384/485 |
| 4,614,446 A * | 9/1986 | Dreschmann et al. | 384/484 |
| 4,806,026 A * | 2/1989 | Bauer et al. | 384/486 |
| 4,834,691 A * | 5/1989 | Schultze et al. | 464/131 |
| 5,639,099 A * | 6/1997 | Booker et al. | 277/402 |
| 5,716,277 A * | 2/1998 | Reynolds | 464/131 |
| 5,769,723 A * | 6/1998 | Faulbecker et al. | 464/131 |
| 5,813,916 A * | 9/1998 | Lentini et al. | 464/128 |
| 5,833,243 A * | 11/1998 | Booker et al. | 277/606 |
| 6,406,187 B1 * | 6/2002 | Lentini et al. | 384/486 |
| 6,601,855 B1 * | 8/2003 | Clark | 277/549 |
| 6,736,731 B2 * | 5/2004 | Schultze et al. | 464/131 |
| 7,465,100 B2 * | 12/2008 | Matsui | 384/486 |
| 2006/0178841 A1 | 8/2006 | Fernandez | |

FOREIGN PATENT DOCUMENTS

| | | |
|---|---|---|
| JP | S51-85154 | 7/1976 |
| JP | H03-94424 U | 9/1991 |
| JP | 11-125338 A | 5/1999 |
| JP | 2006-118662 A | 5/2006 |
| JP | 2006-162079 A | 6/2006 |

OTHER PUBLICATIONS

Maki et al., Nanowire-transistor based ultra-sensitive DNA methylation detection, Biosensors and Bioelectronics, Eselvier BV, NL, vol. 23, No. 6, Aug. 30, 2007, pp. 780-787.

Tegenfeldt Jonas et al., Micro-and nanofluidics for DNA analysis, Analytical and Bioanalytical Chemistry, vol. 378, No. 7, Apr. 2004, pp. 1678-1692.

Sha Michael Y et al., Multiplexed SNP genotyping using nanobarcode particle technology, Analytical and Bioanalytical Chemistry, Springer, Berlin, DE , vol. 384, No. 3, Feb. 1, 2006.

* cited by examiner

SEALING DEVICE FOR UNIVERSAL JOINT

CROSS-REFERENCE TO RELATED APPLICATIONS

This is a national stage of International Application No. PCT/JP2008/067603 filed on Sep. 29, 2008 and published in the Japanese language. This application claims the benefit of Japanese Application No. 2007-266314, filed on Oct. 12, 2007. The disclosures of the above applications are incorporated herein by reference.

BACKGROUND OF THE INVENTION

1. Field of the Invention

The present invention relates to a sealing device for a universal joint, and the sealing device seals a bearing portion of the universal joint used as a connection means for a propeller shaft, a steering shaft, or the like of an automobile.

2. Description of the Conventional Art

A universal joint in a propeller shaft or the like of an automobile is structured such that a yoke provided at a shaft end of a driving side rotary shaft and a yoke provided at a shaft end of a driven side rotary shaft are mutually angle-displaceably connected through a cruciform spider, and rotating force is transmitted from the driving side to the driven side through the cruciform spider. Each of four shaft portions, which project to be mutually cruciformly, of the cruciform spider is inserted into a connection hole through a needle bearing, where the connection hole is provided in a fork-shaped arm of the driving side or driven side yoke. The needle bearing is sealed by a sealing device to prevent grease sealed inside the bearing from leaking, and prevent muddy water from invading from the outside.

Figure 8:
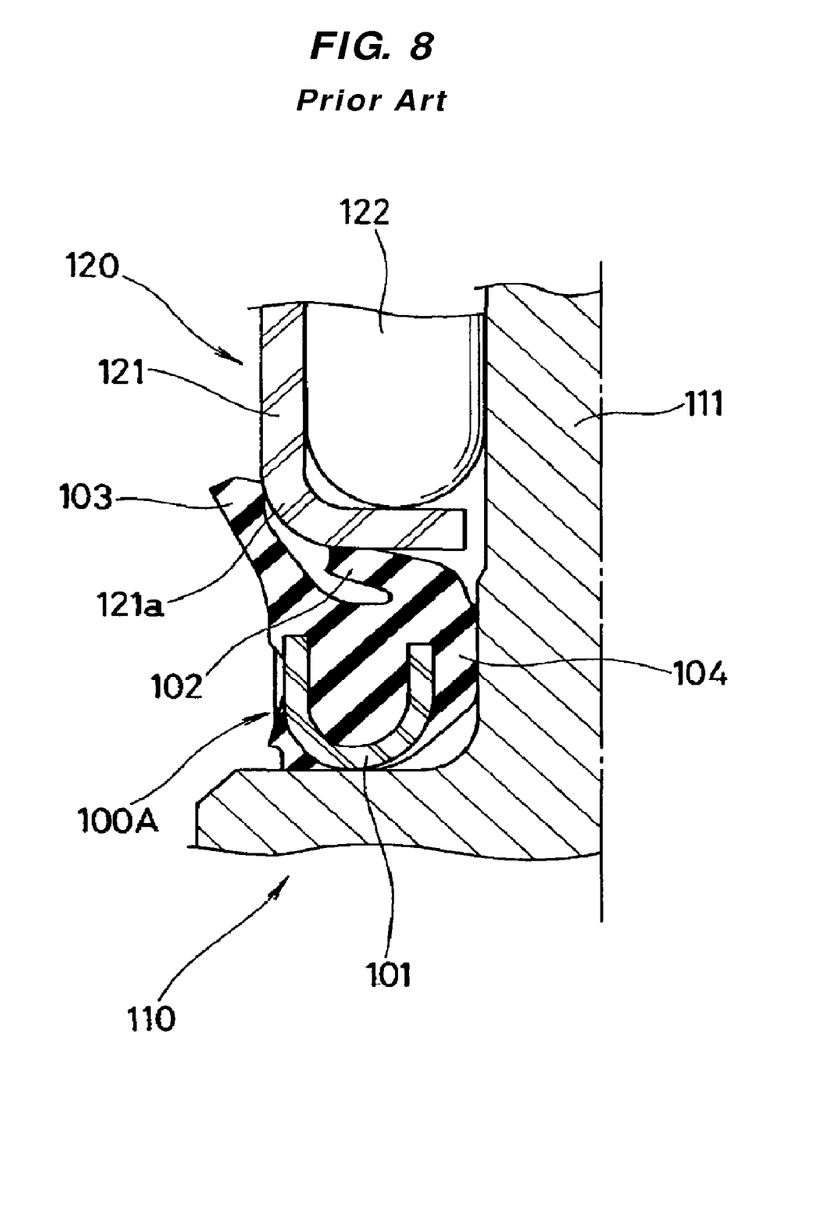
FIG. 8 is a half sectional view of an installation state for illustrating a conventional technique of a sealing device for a universal joint.
Figure 9:
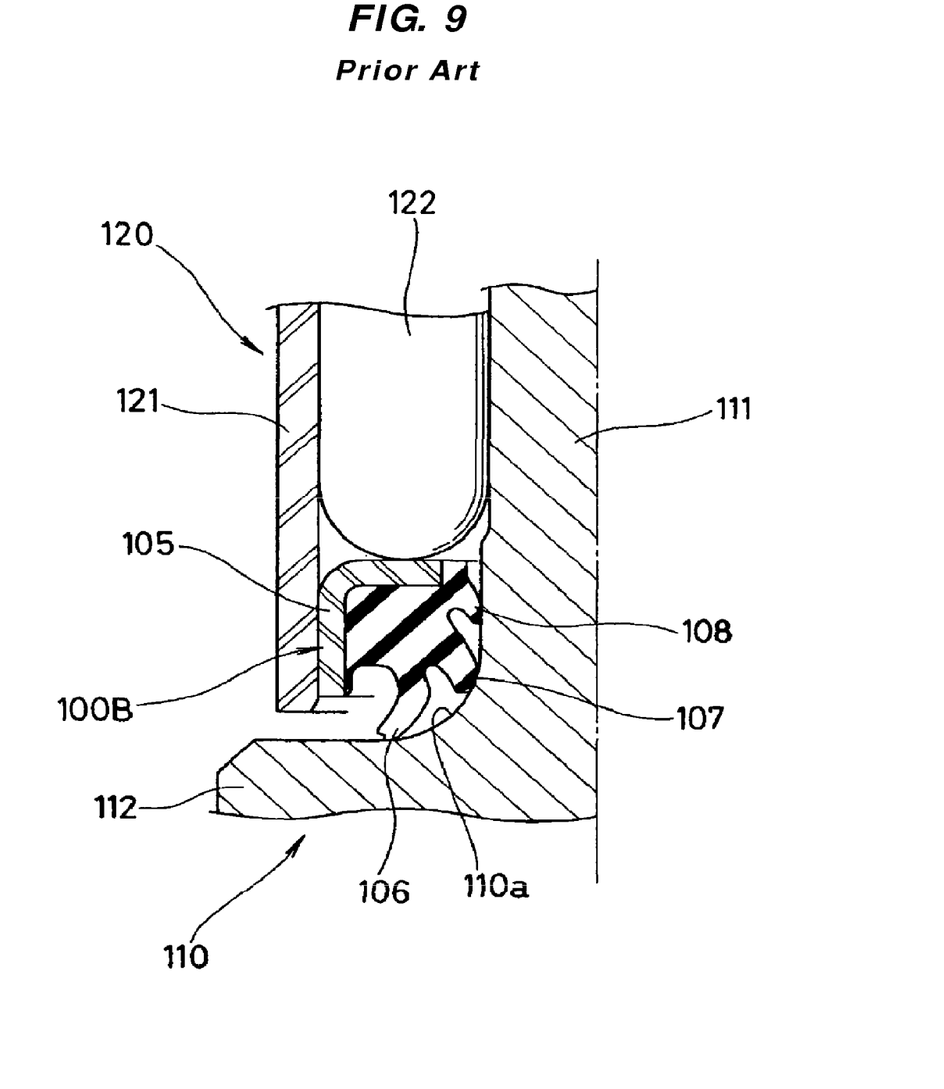
FIG. 9 is a half sectional view of an installation state for illustrating another conventional technique of a sealing device for a universal joint.
Figure 10:
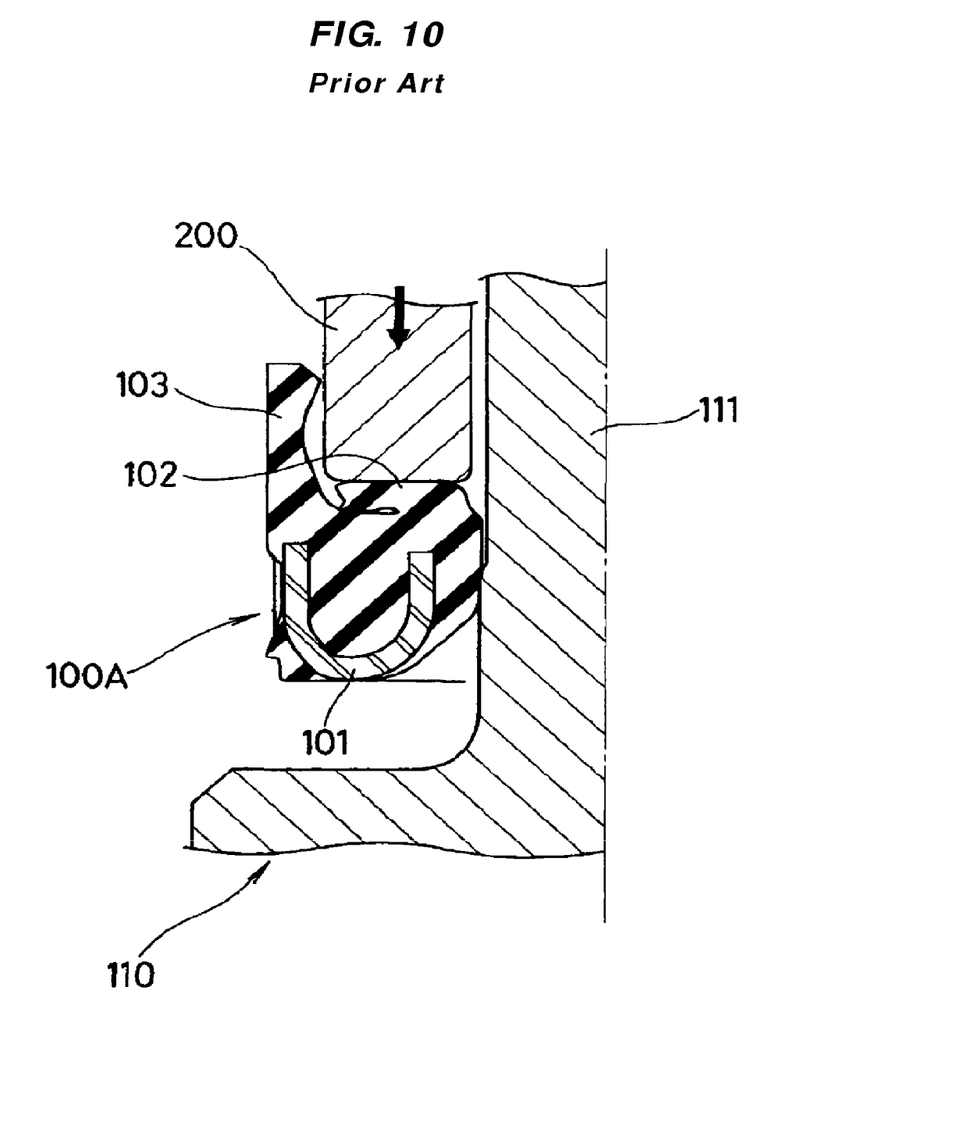
FIG. 10 is a half sectional view for illustrating an installing process of the sealing device illustrated in FIG. 8.

Each of FIGS. 8 and 9 is a half sectional view of an installation state of a sealing device for a universal joint for illustrating a typical conventional technique. FIG. 10 is a half sectional view for illustrating an installing process of the sealing device illustrated in FIG. 8.

In FIGS. 8 and 9, a referential numeral 110 denotes a cruciform spider of a universal joint. A needle bearing 120 includes an outer ring 121 and many cylindrical rolling elements 122. The outer ring 121 is freely arranged at a shaft portion 111 of the cruciform spider 110, and fitted to a connection hole of a yoke not illustrated. The plurality of cylindrical rolling elements 122 is put between the outer ring 121 and the shaft portion 111. In addition, the needle bearing 120 illustrated in FIG. 8 is a comparatively small one for a passenger car, and the outer ring 121 is a comparatively thin part made of a press-molded product. The needle bearing 120 illustrated in FIG. 9 is for a large vehicle, such as a truck, and the outer ring 121 is a comparatively thick part made of a cast product.

A sealing device 100A illustrated in FIG. 8 is attached to the shaft portion 111 of the cruciform spider 110 since the outer ring 121 of the needle bearing 120 is comparatively thin. The sealing device 100A has a plurality of seal lips 102 and 103 and an inner peripheral seal portion 104 at an end of the outer ring 121. These seal lips 102 and 103, and the seal portion 104 are made of a rubber like elastic material and integrally formed with a metal ring 101 (for example, refer to Japanese Patent Application Laid-Open No. 11-125338). A plurality of the seal lips 102 and 103 comes into slidably close contact with a rounded surface of an inward bending portion 121a which is bent by pressing in order to prevent the cylindrical rolling elements 122 from falling out. The inner peripheral seal portion 104 is press-fitted on an outer peripheral surface of the shaft portion 111.

On the other hand, a sealing device 100B illustrated in FIG. 9 is pressed in to be attached to the outer ring 121 of the needle bearing 120. That is, the sealing device 100B has a plurality of seal lips 106 to 108, which are made of a rubber like elastic material and integrally formed with a metal ring 105 (for example, refer to Japanese Patent Application Laid-Open No. 2006-118662 and Japanese Patent Application Laid-Open No. 2006-162079). The metal ring 105 is press-fitted on an inner peripheral surface of an end of the outer ring 121. The plurality of the seal lips 106 to 108 comes into slidably close contact with a curved surface 110a and a near part of the curved surface 110a. The curved surface 110a is formed from the shaft portion 111 of the cruciform spider 110 to a boss portion 112.

Reference is made to Japanese Patent Application Laid-Open No. 11-125338, Japanese Patent Application Laid-Open No. 2006-118662 and Japanese Patent Application Laid-Open No. 2006-162079.

However, in the sealing device 100A illustrated in FIG. 8, the inward bending portion 121a of the outer ring 121 which is close contacted with the seal lips 102 and 103 is formed by pressing work. Thus, the accuracy of curvature of the rounded surface is low, and close contact surface pressure of the seal lips 102 and 103 varies greatly. Therefore, the sealing device 100A has a problem that muddy water sealing performance is instable. Further, as illustrated in FIG. 10, when the sealing device 100A is press-fitted on the shaft portion 111 of the cruciform sper 110 by using a jig 200, the seal lip 102 is necessarily to be pressed, so that the sealing device 100A could be damaged because the seal lip 102 is crushed.

On the other hand, the sealing device 100B illustrated in FIG. 9 is press-fitted to the inner peripheral surface of the end of the outer ring 121 of the needle bearing 120. When the outer ring 121 is made of a press-molded product, the outer ring 121 could be deformed by pressing. Thus, the outer ring 121 is made of a comparatively thick cast product. However, a fitted portion with the metal ring 105 is positioned outside the seal portions with the seal lips 106 to 108. In addition, since the outer ring 121 is made of the cast product, the surface of the outer ring 121 is rough. Therefore, the muddy water sealing performance of the fitted portion with the metal ring 105 could be insufficient. Further, in order to obtain sufficient muddy water sealing performance with the seal lips 106 to 108, the positioning accuracy of the sealing device 100B with respect to the curved surface 110a needs to be high.

SUMMARY OF THE INVENTION

Problems to be Solved by the Invention

The present invention is to solve the aforementioned problems, and is directed to a sealing device for a universal joint capable of preventing seal lips from damaging during installation of the device and having excellent muddy water sealing performance.

Means for Solving the Problem

As for a means for effectively solving the aforementioned technical problems, a sealing device for a universal joint according to the invention of the first aspect includes a metal ring fitted on the outer peripheral surface of a shaft portion of a cruciform spider of the universal joint, and a plurality of seal lips made of a rubber liker elastic material and provided integrally with the metal ring. The seal lips include an inner seal lip and an outer seal lip. The inner seal lip comes into slidably close contact with the inner peripheral surface of an end of an outer ring of a bearing that relatively rotatably supports the shaft portion. The outer seal lip comes into slidably close contact with a rising surface of a boss portion of the cruciform spider. The rising surface is a surface rising, outside the position where the metal ring is fitted, in an outward radial direction from the shaft portion.

As for a sealing device for a universal joint according to the invention of the second aspect, in the configuration described in the first aspect, a flange portion is formed at an inner end of the metal ring, which is directed to the top end side of the shaft portion of the cruciform spider.

As for a sealing device for a universal joint according to the invention of the third aspect, in the configuration described in the first aspect, an outer end of the metal ring, which is directed to the side opposite to the top end of the shaft portion of the cruciform spider, is in contact with the boss portion of the cruciform spider.

As for a sealing device for a universal joint according to the invention of the fourth aspect, in the configuration described in the first aspect, a flange is formed at the end of the outer ring of the bearing, the flange extends at the outside of a position being in close contact with the inner seal lip, and is nearly opposed to a portion outside a position being in close contact with the outer seal lip in the boss portion of the cruciform spider.

Effect of the Invention

According to the sealing device for a universal joint according to the invention of the first aspect, the metal fitting portion between the metal ring and the outer peripheral surface of the shaft portion of the cruciform spider is placed at the inner side from the rising surface of the boss portion of the cruciform spider and the seal portion by the outer seal lip being in close contact with the rising surface of the boss portion. Thus, the sealing device does not have a problem of muddy water sealing performance in the metal fitting portion, and can exert excellent sealing performance. Further, since the metal ring is attached to the shaft portion of the cruciform spider, the outer ring of the bearing can be a press-molded product. As a result, the sealing device can secure higher muddy water sealing performance in the close contact sliding portion of the inner seal lips in comparison with a device having a cast product as the outer ring.

According to the sealing device for a universal joint according to the invention of the second aspect, when the sealing device is installed, the flange portion at the inner end of the metal ring is pressed by a jig or the like. Thus, the sealing device can be pressed on the outer peripheral surface of the shaft portion of the cruciform spider without pressing the seal lip. Therefore, in addition to the effect achieved by the invention of the first aspect, the sealing device can obtain an effect that the seal lip is not crushed and damaged.

According to the sealing device for a universal joint according to the invention of the third aspect, in addition to the effect achieved by the invention of the first aspect, the sealing device can be positioned with high accuracy with respect to the shaft portion of the cruciform spider. As a result, the sealing device can decrease variation of an interference of the outer seal lip with respect to the boss portion of the cruciform spider, and can thus obtain stable sealing performance.

According to the sealing device for a universal joint according to the invention of the fourth aspect, a labyrinth gap extending toward the outside of the outer seal lip is formed between the boss portion of the cruciform spider and the flange extending at the end of the outer ring of the bearing. Therefore, in addition to the effect achieved by the invention of the first aspect, the sealing device can prevent muddy water or the like from invading to the outer seal lip, and can thus more improve the muddy water sealing performance.

DETAILED DESCRIPTION OF PREFERRED EMBODIMENT

Figure 1:
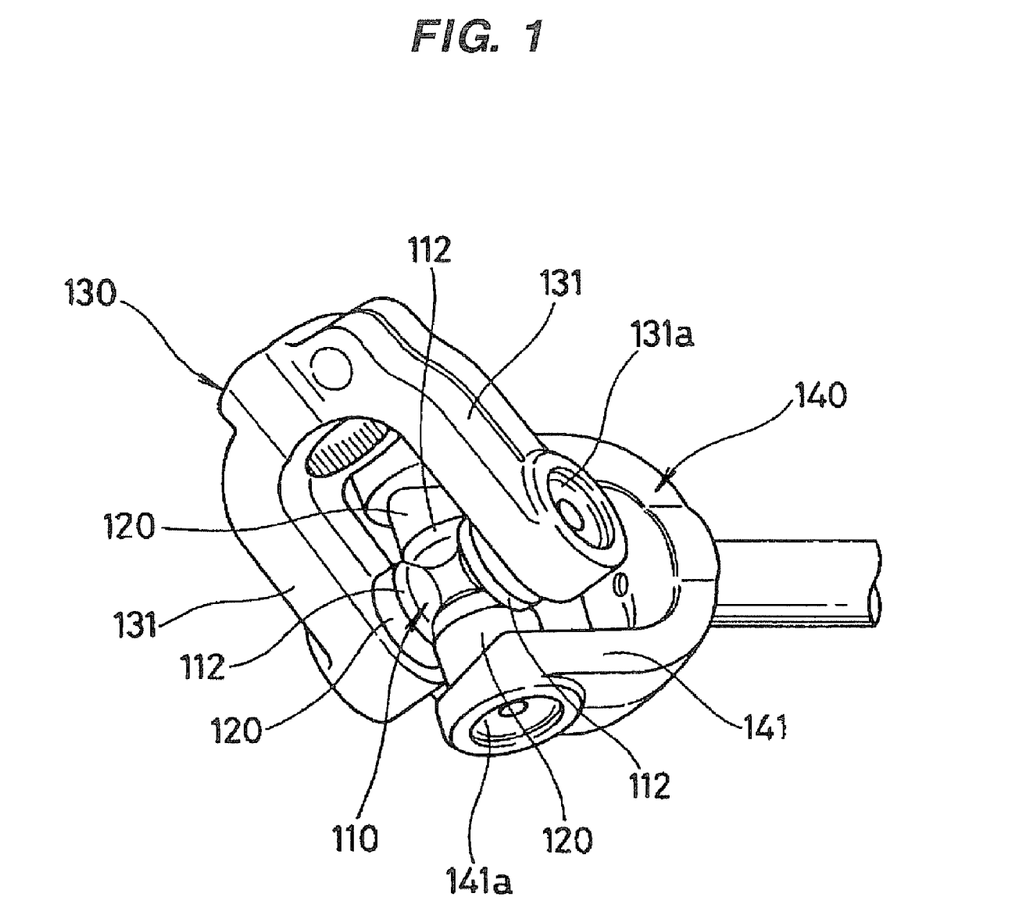
FIG. 1 is a perspective view for illustrating a universal joint.
Figure 2:
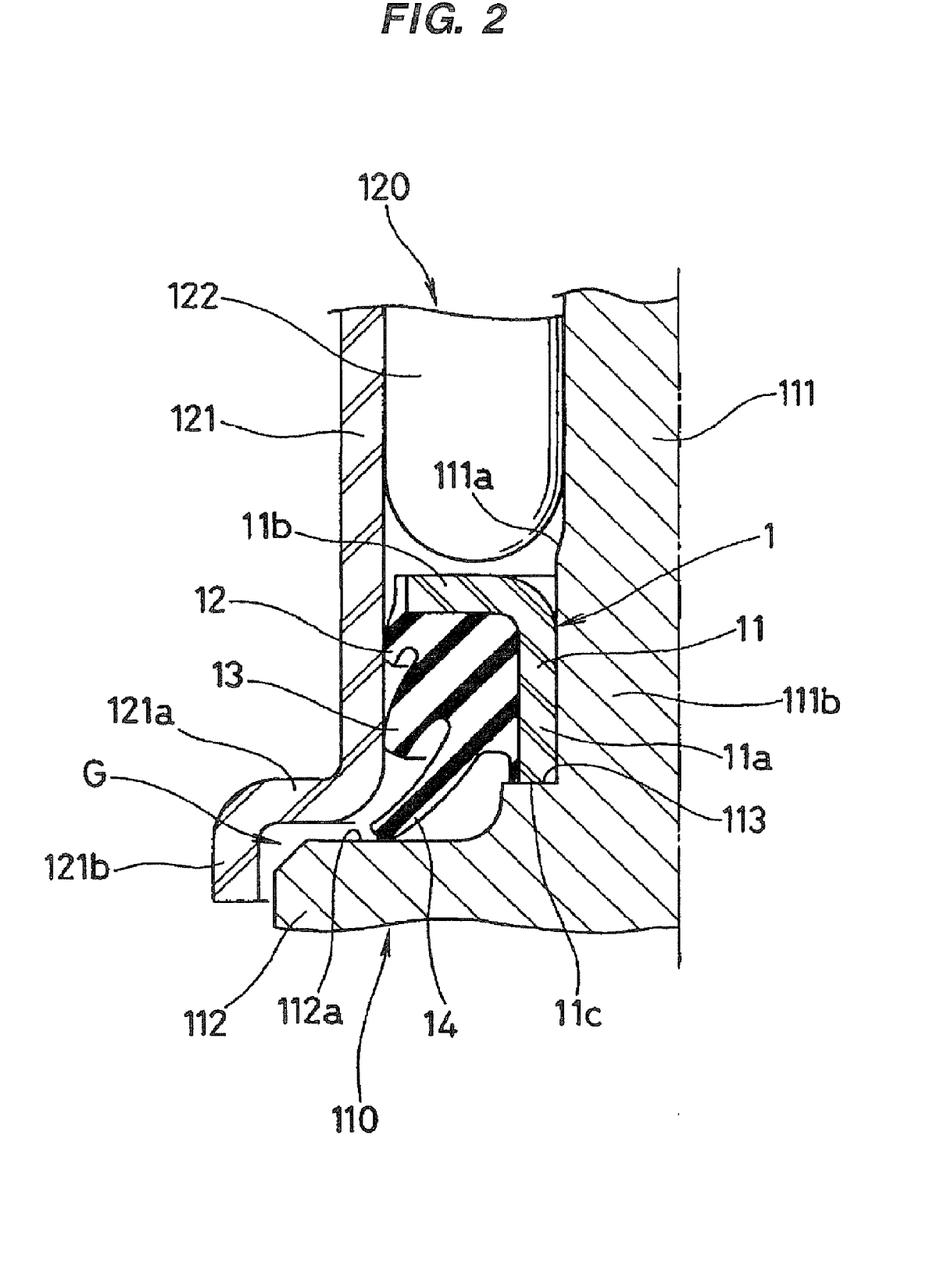
FIG. 2 is a half sectional view for illustrating an installation state of a sealing device for a universal joint according to the present invention.
Figure 3:
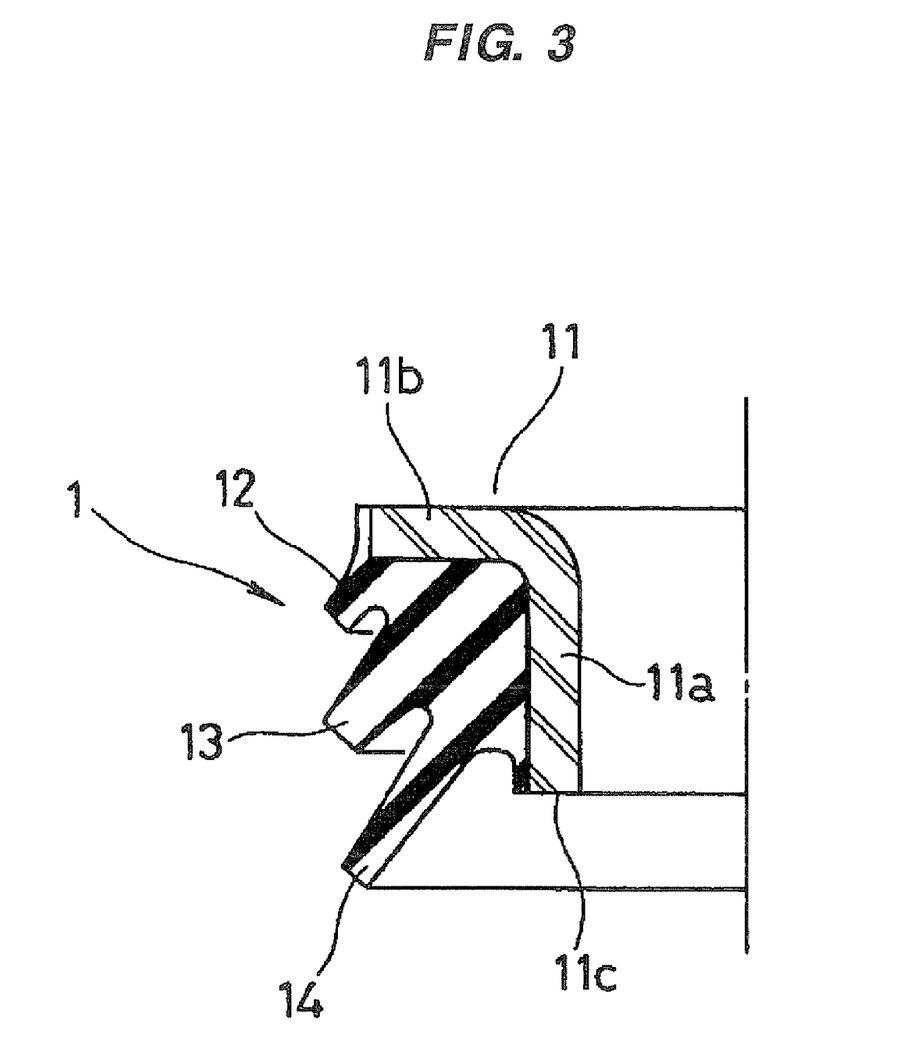
FIG. 3 is a half sectional view for independently illustrating a sealing device for a universal joint according to the present invention.
Figure 4:
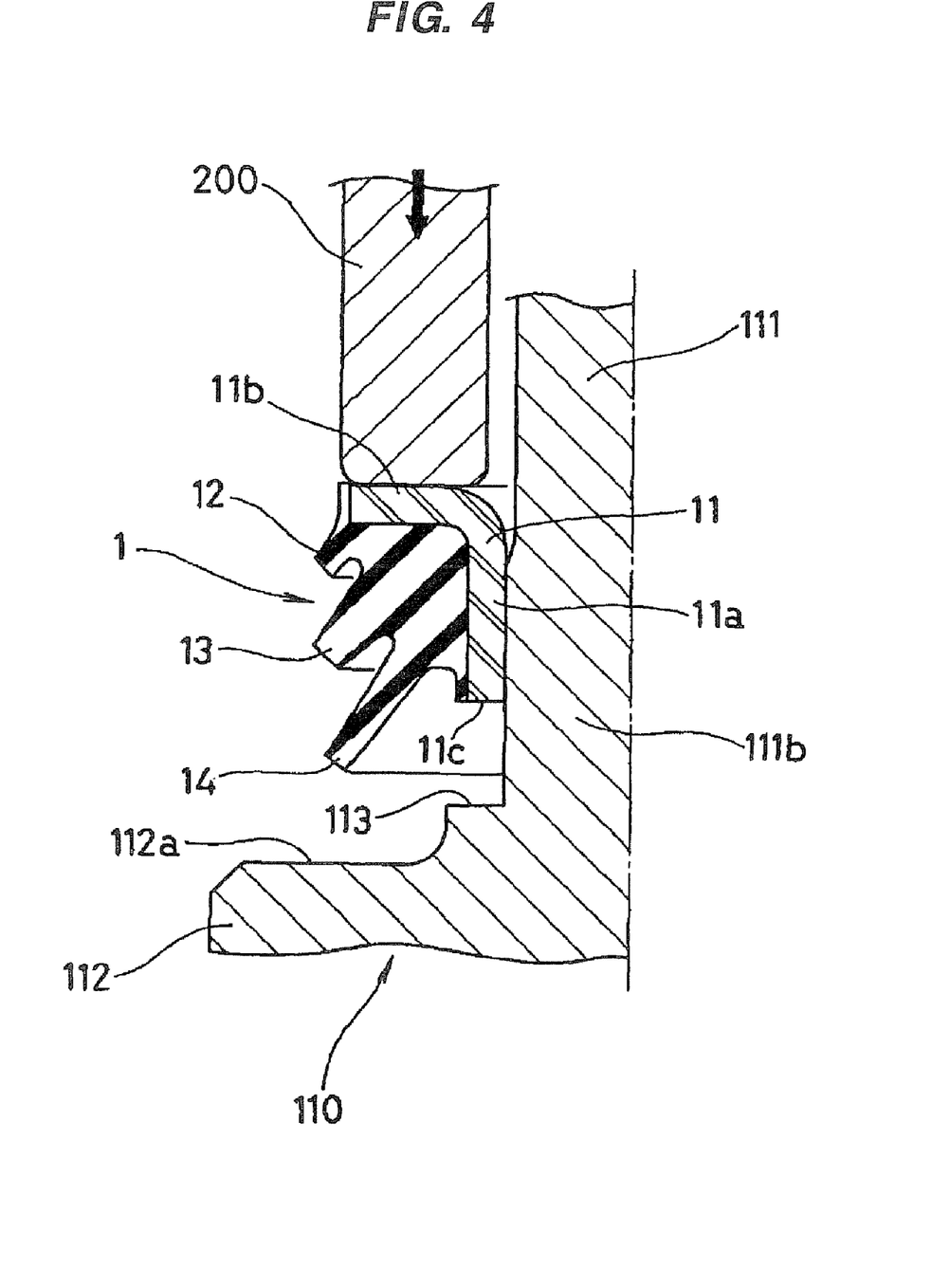
FIG. 4 is a half sectional view for illustrating an installing process of a sealing device for a universal joint according to the present invention.

Preferred embodiments of a sealing device for a universal joint according to the present invention will be described below with reference to the drawings. FIG. 1 is a perspective view for illustrating a universal joint. FIG. 2 is a half sectional view for illustrating an installation state of a sealing device for a universal joint according to the present invention. FIG. 3 is a half sectional view for independently illustrating a sealing device for a universal joint according to the present invention. FIG. 4 is a half sectional view for illustrating an installing process of a sealing device for a universal joint according to the present invention.

A schematic configuration of a universal joint will be described. As illustrated in FIG. 1, the universal joint is structures such that a yoke 130 provided at one of shaft ends of a driving side rotary shaft and a driven side rotary shaft, and a yoke 140 provided at the other shaft end are mutually angle-displaceably connected through a cruciform spider 110. The cruciform spider 110 has four shaft portions (reference numeral 111 in FIG. 2 etc.) projecting in the mutually rectangular directions to form a cruciform shape, and boss portions 112 rising in outward radial directions from the crossing portion sides of the four shaft portions. Each shaft portion is fitly inserted into connection holes 131a and 141a through a needle bearing 120, where the connection holes 131a and 141a are provided in fork-shaped arms 131 and 141 of the yoke 130 and 140.

As illustrated in FIG. 2, the needle bearing 120 is arranged on an outer periphery of the shaft portion 111 of the cruciform spider 110. The needle bearing 120 includes a bottomed cylindrical outer ring (which is also called a shell cup) 121, which is made of a press molded metal product and fitted to the connection hole 131a or 141a of the yoke 130 or 140 in FIG. 1, and includes many steel cylindrical rolling elements 122 put between the outer ring 121 and the shaft portion 111. The inside of the needle bearing 120 is lubricated with grease not illustrated.

As illustrated in FIGS. 2 and 3, the sealing device 1 for a universal joint (hereinafter, simply said to as the sealing device) according to the present invention includes a metal ring 11 produced by punch press molding of a metal plate such as a steel plate, and a first inner seal lip 12, a second inner seal lip 13 and outer seal lip 14 which are made of a rubber-like elastic material and integrally formed (vulcanizingly adhering) with the metal ring 11.

At the boss portion 112 side end portion of an area, where the cylindrical rolling elements 122 of the needle bearing 120 rollingly contact, in the outer peripheral surface of the shaft portion 111 of the cruciform spider 110, a conical stepped surface 111a is formed to have a slightly large diameter at the boss portion 112 side. Further, the metal ring 11 in the sealing device 1 includes a fitting cylindrical portion 11a and a flange portion 11b. The fitting cylindrical portion 11a is press-fitted on the outer peripheral surface of a root portion 111b at the boss portion 112 side from the conical stepped surface 111a in the shaft portion 111 so as to have an appropriate interference. The flange portion 11b extends in the outward radial direction from an inner end of the fitting cylindrical portion 11a directed toward the top end side of the shaft portion 111. The first inner seal lip 12, the second inner seal lip 13 and the outer seal lip 14 are formed at the outer peripheral side of the fitting cylindrical portion 11a.

A radial direction stepped surface 113 is continuously formed in the circumferential direction between the boss portion 112 and the root portion 111b of the shaft portion 111 of the cruciform spider 110. In the state of installing the sealing device 1, an outer end (an end opposite to the flange portion 11b) 11c of the fitting cylindrical portion 11a of the metal ring 11 is in contact with the radial direction stepped surface 113.

The first inner seal lip 12 and the second inner seal lip 13 are directed toward the outer side of the needle bearing 120 in the state of installing the sealing device 1, and have a conically cylindrical shape having a large diameter at the top end side. The top ends of each of the first and second inner seal lips 12 and 13 come into slidably close contact with the inner peripheral surface of an end in the outer ring 121 of the needle bearing 120.

The outer seal lip 14 is formed at the outer side in an axial direction from the first inner seal lip 12 and the second inner seal lip 13. In the state of installing the sealing device 1, the outer seal lip 14 is directed toward the outer side of the needle bearing 120, and has a conically cylindrical shape to have a large diameter at the top end side. The top end side of the outer seal lip 14 comes into slidably close contact with a rising surface 112a of the boss portion 112 of the cruciform spider 110.

The outer ring 121 of the needle bearing 120 has a flange 121a and a cylindrical edge portion 121b at the end thereof. The flange 121a extends in the outward radial direction from the outside of the position being in close contact with the first inner seal lip 12 and the second inner seal lip 13, and is nearly opposed in an axial direction to the rising surface 112a of the boss portion 112 of the cruciform spider 110 outside the outer seal lip 14. The cylindrical edge portion 121b bends in an axial direction toward the outer peripheral side of the boss portion 112 from the outer diameter end of the flange 121a. Therefore, a labyrinth gap G in a bending shape having an approximately L-shaped cross section is formed between the flange 121a and the cylindrical edge portion 121b, and the boss portion 112.

The sealing device 1 having the aforementioned configuration prevents grease sealed inside the needle bearing 120 from leaking to an outside of the outer ring 121, and prevents muddy water and the like from invading from an outside.

The first inner seal lip 12 and the second inner seal lip 13 are in close contact with the inner peripheral surface in a cylindrical surface shape of outer ring 121. Since excessive force caused by press-fitted or the like is not applied to the outer ring 121, a press formed product can be adopted. As a result, the outer ring 121 can have higher muddy water sealing performance at a portion in slidably close contact with the inner seal lips 12 and 13, in comparison with that of an outer ring made of a cast product. Further, the outer seal lip 14 comes into close contact with the plane rising surface 112a in the boss portion 112 of the cruciform spider 110, and in addition, the outer end 11c of the fitting cylindrical portion 11a of the metal ring 11 is in contact with the radial direction stepped surface 113 of the cruciform spider 110. Thus, the positioning accuracy of sealing device 1 becomes to be high. Therefore, the sealing device 1 is different from the aforementioned conventional techniques illustrated in FIGS. 8 and 9, in which a seal lip is in close contact with a bending surface or curving surface, and has stable sealing performance with the less variation of interference.

Further, the labyrinth gap G, which is formed with the boss portion 112 of the cruciform spider 110, the flange 121a extending from the end of the outer ring 121, and the cylindrical edge portion 121b, has a labyrinth sealing function to prevent muddy water or the like from invading into the sliding seal portion sealed by the first inner seal lip 12 and the second inner seal lip 13, and into the sliding seal portion sealed by the outer seal lip 14. Thus, abrasions of the seal lips 12 to 14 caused by the muddy water or the like can be suppressed, and stable muddy water sealing performance can be secured for a long period of time.

In addition to this, in the state of installing the sealing device 1 as illustrated in FIG. 2, a metal fitting portion between the fitting cylindrical portion 11a of the metal ring 11 and the outer peripheral surface of the root portion 111b in the shaft portion 111 of the cruciform spider 110 is located at the inner side from the rising surface 112a of the boss portion 112 of the cruciform spider 110 and the seal portion sealed by the outer seal lip 14 being in close contact with the rising surface 112a. Thus, there is no problem in muddy water sealing performance at the metal fitting portion.

As illustrated in FIG. 4, when the sealing device 1 is installed to the shaft portion 111 of the cruciform spider 110, the sealing device 1 is externally inserted so as to make the seal lips 12 to 14 to be directed toward the boss portion 112 side, the flange portion 11b at the inner end of the metal ring 11 directed toward the top end side of the shaft portion 111 is pressed by a jig 200 or the like, and then the sealing device 1 is press-fitted against frictional force by the interference of the fitting cylindrical portion 11a of the metal ring 11 with respect to the outer peripheral surface of the root portion 111b of the shaft portion 111. Further the sealing device 1 is pressed to a position at which the outer end 11c of the fitting cylindrical portion 11a comes into contact with the radial direction stepped surface 113 of the cruciform spider 110. As a result, the outer seal lip 14 comes into close contact with the rising surface 112a of the boss portion 112 at an appropriate surface pressure. Therefore, there is no such a risk that the seal lips 12 to 14 are crushed and damaged by the jig 200, and the sealing device 1 can be installed with the high positioning accuracy as mentioned above.

In addition, since the first inner seal lip 12 and the second inner seal lip 13 are directed toward the outer side of the needle bearing 120, at a time of pouring grease into the needle bearing 120, an internal pressure increases to push and open the first inner seal lip 12 and the second inner seal lip 13, and discharges excessive grease easily.

Further, the cylindrical rolling elements 122 of the needle bearing 120 roll on the outer peripheral surface at the small diameter side made by the conical stepped surface 111a formed on the shaft portion 111 of the cruciform spider 110, and the conical stepped surface 111a restricts the axial movement of the cylindrical rolling elements 122. In addition to this, the flange portion 11b of the metal ring 11 has a function to restrict the axial movement of the cylindrical rolling elements 122.

Figure 5:
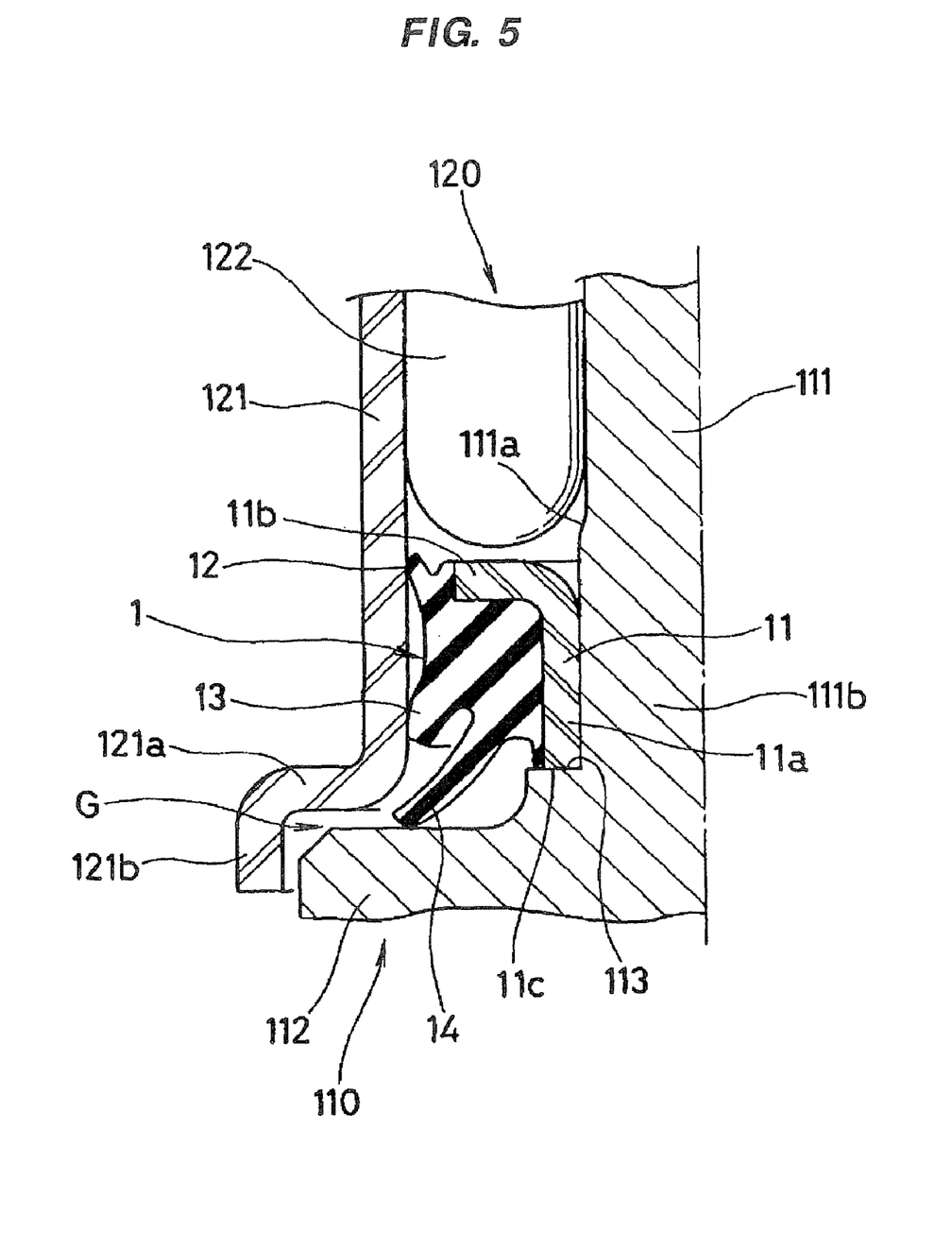
FIG. 5 is a half sectional view for illustrating an installation state of another embodiment of a sealing device for a universal joint according to the present invention.

FIG. 5 is a half sectional view to illustrate an installation state of another embodiment of a sealing device for a universal joint according to the present invention.

The embodiment in FIG. 5 is different from the embodiment in FIG. 2 in the point that the first inner seal lip 12 at the innermost side of the needle bearing 120 in the state of installing the sealing device 1 is directed toward the side opposite to the second inner seal lip 13 and the outer seal lip 14, that is, directed toward the inside of the bearing. However, the embodiment in FIG. 5 has a similar configuration to that of FIG. 2 other than the direction of the first inner seal lip 12. That is, for the bearing in which grease is not sealed, the internal pressure at a time of injection of grease does not need to be released to discharge excessive grease. Thus, the first inner seal lip 12 can be directed reversely as illustrated in FIG. 5.

Figure 6:
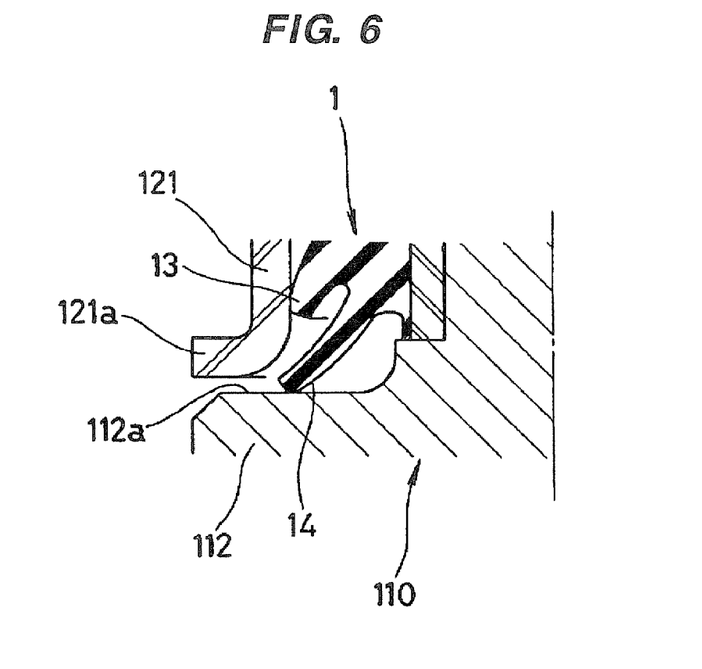
FIG. 6 is a sectional view of main parts for illustrating an installation state of yet another embodiment of a sealing device for a universal joint according to the present invention.
Figure 7:
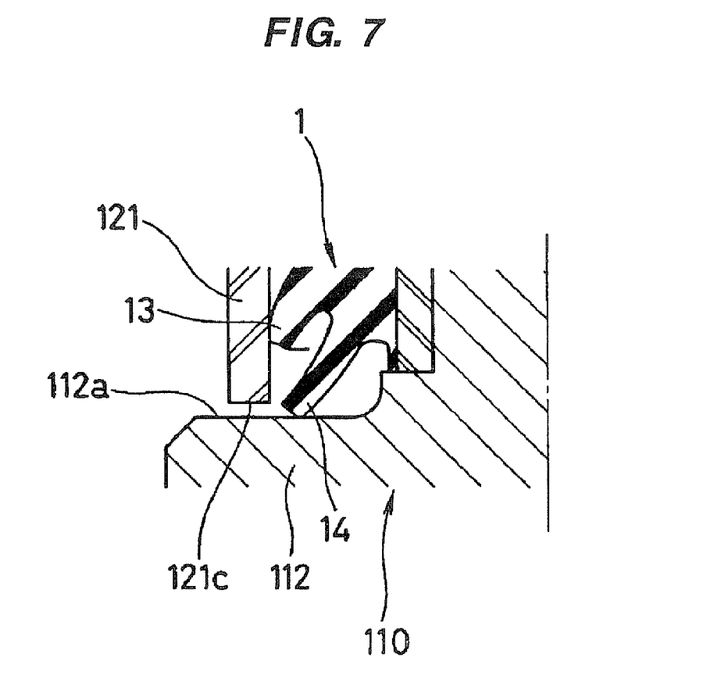
FIG. 7 is a sectional view of main parts for illustrating an installation state of yet another embodiment of a sealing device for a universal joint according to the present invention.

FIGS. 6 and 7 are sectional views of main parts for illustrating installation states of yet other embodiments of a sealing device for a universal joint according to the present invention.

The embodiment illustrated in FIG. 6 includes only the flange 121a formed at the end of the outer ring 121 of the needle bearing 120. The flange 121a extends in the outward radial direction from the outside of the position being in close contact with the second inner seal lip 13, and is nearly opposed in an axial direction to the rising surface 112a of the boss portion 112 of the cruciform spider 110 outside the outer seal lip 14. The embodiment illustrated in FIG. 7 includes the edge end portion 121c of the outer ring 121, which is nearly opposed in an axial direction to the rising surface 112a of the boss portion 112 outside the outer seal lip 14.

Selection of the shape of the end of the outer ring 121, that is, the bending shape in FIG. 2, the shape in FIG. 6, or the shape in FIG. 7, can be determined arbitrarily depending on conditions such as a scattering direction of muddy water and the like and frequency of the scattering.

What is claimed is:

1. A universal joint comprising:
   a cruciform spider having a shaft portion and a boss portion, the boss portion having a rising surface and a cylindrical surface;
   a bearing having an outer ring, an inner peripheral surface of an end of the outer ring relatively rotatably supporting said shaft portion, the outer ring having a second flange with a radial flange that faces the rising surface of the boss portion and a cylindrical portion at the end thereof:
   a sealing device having:
   a metal ring fitted on an outer peripheral surface of the shaft portion of the cruciform spider in the universal joint; and
   a plurality of seal lips made of an elastomeric material and provided integrally with said metal ring, wherein said seal lips include an inner seal lip and an outer seal lip, the inner seal lip contacts the inner peripheral surface of the end of the outer ring of the bearing relatively rotatably supporting said shaft portion, the outer seal lip contacts the rising surface of the boss portion of said cruciform spider, the rising surface rises outside a position where said metal ring is fitted, in an outward radial direction from said shaft portion, and the metal ring has a first flange portion formed at an inner end thereof directed toward a top end side of said shaft portion, and
   wherein the second flange extends outside of a position of close contact with the inner seal lip, the radial flange is closely opposed to the rising surface of the boss portion of said cruciform spider outside a position of close contact with the outer seal lip to form a radial labyrinth gap between the second flange and the rising surface of the boss portion and the cylindrical portion of the second flange is closely opposed to the cylindrical surface of the boss portion to form a cylindrical labyrinth gap therebetween.

2. The sealing device for a universal joint as claimed in claim 1, wherein an outer end of the metal ring directed toward the side opposite to a the top end side of the shaft portion of the cruciform spider comes into contact with a radially directed stepped surface formed on said cruciform spider.

3. A universal joint comprising:
   a cruciform spider having a shaft portion and a boss portion having a rising surface and a cylindrical surface;
   a metal ring fitted on an outer peripheral surface of the shaft portion, the metal ring having a first flange at a first end thereof, the first end being toward a top end side of the shaft portion;
   an outer ring of a bearing rotatably supporting the shaft portion, the outer ring having a second flange with a radial flange that faces the rising surface of the boss portion and a cylindrical portion formed at an end thereof, the end being toward a bottom end side of the shaft portion;
   an elastomeric inner seal lip provided integrally with the metal ring, the inner seal lip contacts an inner peripheral surface of the outer ring; and
   an elastomeric outer seal lip provided integrally with the metal ring, the outer seal lip contacts the rising surface of the boss portion, the rising surface rising in an outward radial direction from the shaft portion outside a position where the metal ring is fitted,
   wherein the second flange extends outside of a position where the inner seal lip closely contacts the outer ring, the radial flange is closely opposed to the rising surface of the boss portion of said cruciform spider outside a position of close contact with the outer seal lip to form a radial labyrinth gap between the second flange and the rising surface of the boss portion and the cylindrical portion of the second flange is closely opposed to the cylindrical surface of the boss portion to form a cylindrical labyrinth gap therebetween.

* * * * *